May 15, 1962 H. WEBSTER 3,035,081
PROCESS FOR PREPARING DIALKYL ALKYLPHOSPHONOTHIONATES
Filed June 11, 1959
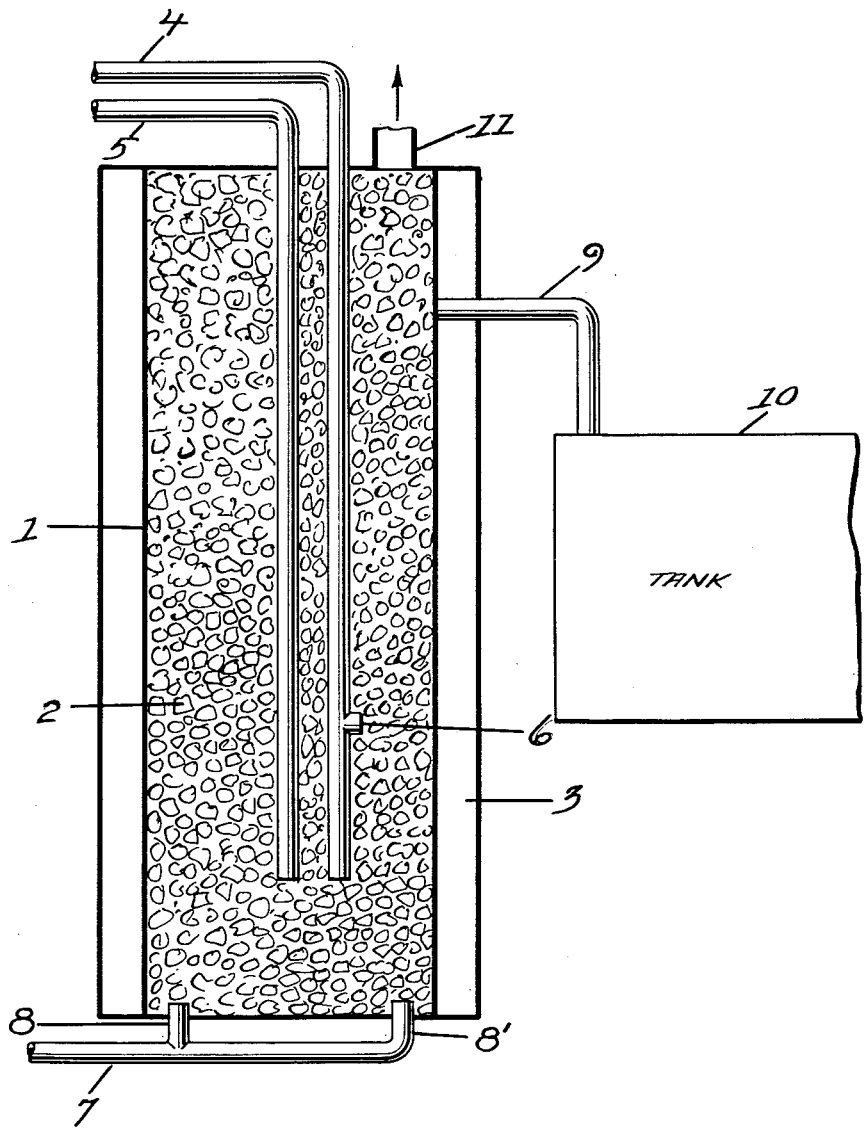
INVENTOR
HAROLD WEBSTER,
BY *Bailey, Stephens & Huettig*
ATTORNEYS

United States Patent Office 3,035,081
Patented May 15, 1962

---

3,035,081
PROCESS FOR PREPARING DIALKYL ALKYLPHOSPHONOTHIONATES
Harold Webster, Redruth, Cornwall, England, assignor to National Research Development Corporation, London, England, a British corporation
Filed June 11, 1959, Ser. No. 819,607
Claims priority, application Great Britain June 12, 1958
7 Claims. (Cl. 260—461)

The present invention relates to the manufacture of the dialkyl alkylphosphonothionates, a number of which are used as insecticides.

The invention provides an improved process by which the dialkyl alkylphosphonothionates may be manufactured from the appropriate alkylphosphonous dichloride, the appropriate alcohol and sulfur.

Hitherto the complete reaction has been carried out in more than one stage and it has been necessary to provide in the reaction vessel some additional substance with the reagents for removing the hydrogen chloride produced by the reaction from the reaction zone in order that the reaction may proceed to give satisfactory yields of the dialkyl alkylphosphonothionate. Such processes have employed a solvent in which the reaction takes place and which have high sulfur and low hydrogen chloride solubility or alternatively have employed a hydrogen chloride acceptor such as a tertiary base.

The present invention provides a simple and rapid process by which the dialkyl alkylphosphonothionates may be synthesized in a single reaction vessel without the use or presence of any other substance to remove the hydrogen chloride produced.

It has been discovered that if the reaction mixture is heated to a temperature in the region of its boiling point and maintained at this temperature in the liquid state the hydrogen chloride produced as the reaction proceeds readily vaporises so that its concentration in the liquid reaction phase is low and the reaction can proceed until a satisfactory yield of the dialkyl alkylphosphonothionate is obtained.

It has been established that the following three reactions take place:

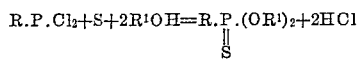
(1)

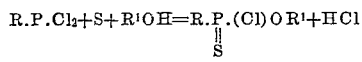
(2)

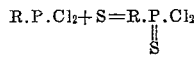
(3)

In this earlier part of the reaction period all three reactions (1), (2) and (3) proceed, at first the reactions (2) and (3) predominate, the hydrogen chloride produced catalysing the production of alkylphosphonothionic dichloride in accordance with reaction (3). The maintenance of the mixture at the elevated temperature close to its boiling point for a further period brings about an increase in the concentration of the dialkyl alkylphosphonothionate and a decrease in the concentration of alkyl alkylphosphonochloridothionate produced in accordance with reaction (2) and alkylphosphonothionic dichloride produced in accordance with reaction (3) as these two intermediate products react with alcohol to produce dialkyl alkylphosphonothionate respectively in accordance with the following reactions:

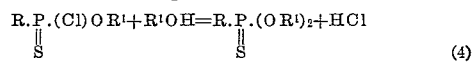
(4)

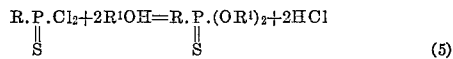
(5)

As indicated by reaction Equation 1, two mols of alcohol are required by the reaction for each mol of alkylphosphonous dichloride. It is advantageous however for the alcohol to be present in less than its stoichiometric proportion during the initial part of the reaction to ensure that there is not an unnecessary amount of unreacted alcohol then as this alcohol is a solvent for the hydrogen chloride produced. It is however also preferable for the alcohol to be present in at least stoichiometric proportions when the reaction is nearing completion.

When the process is carried out batchwise it is consequently advantageous for the alcohol to be added, preferably slowly, to a mixture of the alkylphosphonous dichloride at a temperature near to the boiling point of the mixture until the alcohol is present in at least stoichiometric proportions.

When the process is carried out in a continuous manner, it is important that the alcohol is not present for at any significant time in excess and where the liquid alcohol and alkylphosphonous dichloride are supplied to sulfur in a reaction zone the rate of supply of these two reactants should be maintained with reasonable accuracy in the required stoichiometric proportions.

In order that the working of processes in accordance with the invention may be fully understood, the preparation of dialkyl alkylphosphonous chlorides by batch and continuous processes will now be described.

The alkylphosphonous dichloride used may be methylphosphonous dichloride or ethylphosphonous dichloride while the alcohol participating in the reaction may be any lower alcohol such as methanol, ethanol, a propanol or a butanol and an alkyl group in the specification means a lower alkyl group containing not more than four carbon atoms. Similarly, the expression alcohol in this specification means an aliphatic alcohol having not more than four carbon atoms.

The following four examples illustrate a process for producing a dialkyl alkylphosphonothionate which comprises treating the appropriate alkylphosphonous dichloride with elementary sulfur, heating the mixture to a temperature in the region of its boiling point, slowly adding the appropriate alcohol and maintaining the mixture at this temperature for a further period during which the concentration of dialkyl alkylphosphonothionate over alkyl alkylphosphonochloridothionate progressively increases until a good yield of the dialkyl alkylphosphonothionate is obtained.

EXAMPLE 1

*Diethyl Methylphosphonothionate*

234 g. (2 mol) of methylphosphonous dichloride are mixed with 64 g. of sulfur flowers in a 500 ml. three necked flask fitted with condenser, stirrer, dropping funnel, thermometer and nitrogen inlet. Nitrogen is passed in a slow stream while the mixture is heated to 75° C. 260 g. (5.65 mol) of ethyl alcohol are then slowly added over a period of the order of half an hour, the temperature being maintained between 75° and 85°C. Copious evolution of hydrogen chloride occurs. After approximately half the alcohol has been added the sulfur almost disappears and the rate of evolution of hydrogen chloride diminishes. Addition of the remainder of the alcohol causes only slight reaction. The almost clear solution is then heated at about 75° C. for two hours. Unchanged alcohol is then removed by distillation under slightly reduced pressure. The residual liquid is fractionated in vacuo. 267 g. (an 80% yield) of diethyl methylphosphonothionate are obtained.

EXAMPLE 2

Di-n-Propyl Methylphosphonothionate 234 g. (2 mol) of methylphosphonous dichloride, 64 g. of sulfur and 252 g. (4.2 mol) of n-propyl alcohol are reacted in a manner described in Example 1. The mixture is heated for a total period of 3½ hours. 300 g. (a 77% yield) of di-n-propyl methylphosphonothionate are obtained.

EXAMPLE 3

Di-n-Butyl Methylphosphonothionate 234 g. (2 mol) of methylphosphonous dichloride, 64 g. of sulfur and 444 g. (6.0 mol) of n-butyl alcohol are reacted in a manner described in Example 1. The mixture is heated for a total period of 3½ hours. 324 g. (a 72% yield) of di-n-butyl methylphosphonothionate are obtained.

EXAMPLE 4

Dimethyl Methylphosphonothionate 234 g. (2 mol) of methylphosphonous dichloride, 64 g. of sulfur and 160 g. (5 mol) of methyl alcohol are reacted in a manner described in Example 1. The mixture is heated for a total period of 3 hours. 144 g. (a 51% yield) of dimethyl methylphosphonothionate are obtained. This relatively low yield is probably due to the inherent instability of dimethyl esters in general.

A suitable continuous process for making dialkyl alkylphosphonothionates operates as follows:

A tower is packed with rock sulfur cubes of about ½" size and is maintained at the appropriate temperature (80°–90° C. for the production of diethyl methylphosphonothionate) by a suitable heating jacket. The tower is provided with two feed pipes which pass the alcohol and alkylphosphonous dichloride centrally down within the heated tower to the base region whence the reagents are admitted to the reaction mixture already surrounding the sulfur cubes. A constant stream of nitrogen is passed through the reaction mixture. Hydrogen chloride is evolved and escapes upwards through the reaction medium and passes out through an outlet vent at the top of the tower.

It is important that the supply of alkylphosphonous dichloride and alcohol is maintained as accurately as possible in the stoichiometric proportions of one mol of alkylphosphonous dichloride to two mols of alcohol so that the alcohol is not in excess during the initial stage of the reaction. This effect may be enhanced by arranging for at least part of the alcohol feed to be supplied at a level which is higher than that at which the alkylphosphonous dichloride is supplied either by terminating the alcohol feed pipe at a higher level than the other pipe or by perforating the alcohol feed pipe.

The reaction medium containing the crude dialkyl alkylphosphonothionate is allowed to overflow from the top of the tower and pass to a settling tank in which the sulfur settles to leave a clear liquid. The clear liquid may then be degassed and any unreacted alcohol removed by distillation if necessary.

The alkylphosphonous dichloride and alcohol are supplied to the reaction mixture at a steady rate which may be such that the mean residence time of liquid material in the reaction vessel is of the order of twenty minutes, appreciably less than the total reaction time for the batch processes previously described.

An initial liquid support for the sulfur before the addition of alcohol and alkylphosphonous dichloride may be provided in the form of the dialkyl alkylphosphonothionate which is to be produced by the process and it will be appreciated that such an initial provision is not outside the scope of the invention as the product is soon produced in the reaction mixture.

The accompanying drawing diagrammatically shows an apparatus suitable for carrying out the process according to the invention.

In such drawing, tower 1 is packed with sulfur 2. Heating jacket 3 is provided to maintain the appropriate reaction temperature. Feed pipes 4 and 5 are provided to supply the alcohol and alkylphosphonous dichloride respectively to the base region of the tower. A secondary outlet 6 is provided in the alcohol feed pipe 4 so that a portion of the alcohol is supplied at a higher level than the alkylphosphonous dichloride. Pipe 7 with outlets 8 and 8' in the bottom of the tower is provided for the introduction of an inert gas into the bottom of the tower. The reaction medium containing the crude dialkyl alkylphosphonothionate leaves the tower through overflow pipe 9 and is collected in settling tank 10. The hydrogen chloride involved escapes from the tower through outlet 11.

I claim:

1. A process for producing a dialkyl alkylphosphonothionate which comprises forming a mixture of an alkylphosphonous dichloride selected from the group consisting of methyl and ethyl phosphonous dichlorides with elemental sulfur and a lower alkanol, and maintaining the said mixture in the liquid phase at a temperature in the region of its boiling point.

2. A process for the manufacture of a dialkyl alkylphosphonothionate which comprises forming a mixture of an alkylphosphonous dichloride selected from the group consisting of methyl and ethyl phosphonous dichlorides with elemental sulfur and a lower alkanol in such proportions that the alcohol is not in excess of its stoichiometric proportions with respect to the dichloride, and maintaining the said mixture in the liquid phase at a temperature in the region of its boiling point whereby hydrogen chloride produced as the reaction proceeds is liberated in the gaseous phase, and adding more alcohol until it is present in at least stoichiometric proportions before the completion of the reaction.

3. A process for the manufacture of a dialkyl alkylphosphonothionate which comprises forming a mixture of an alkylphosphonous dichloride selected from the group consisting of methyl and ethyl phosphonous dichlorides with elemental sulfur and heating the mixture to a temperature in the region of and below its boiling point, adding a lower alkanol to the said mixture until it is present in at least stoichiometric proportions to form a resulting mixture which is maintained in the liquid phase at a temperature in the region of its boiling point whereby hydrogen chloride produced as the reaction proceeds is liberated in the gaseous phase.

4. A process for the manufacture of a dialkyl alkylphosphonothionate which comprises introducing into a reaction vessel containing sulfur one molar proportion of an alkylphosphonous dichloride selected from the group consisting of methyl and ethyl phosphonous dichlorides and substantially two molar proportions of a lower alkanol, maintaining the reaction vessel at a temperature just below the boiling point of the reaction mixture and removing from the reaction vessel the reaction product containing dialkyl alkylphosphonothionate.

5. A process for the manufacture of a dialkyl alkylphosphonothionate which comprises steadily introducing an alkylphosphonous dichloride selected from the group consisting of methyl and ethyl phosphonous dichlorides at a given molar rate and a lower alkanol at approximately twice this molar rate into the lower part of a reaction mixture containing throughout elemental sulfur, maintaining the reaction mixture at an elevated temperature just below the boiling point of the alcohol-dialkylphosphonous dichloride mixture whereby the reaction mixture is maintained in the liquid state, and withdrawing the reaction product as a liquid from the top of the reaction mixture.

6. A process according to claim 5 and in which an inert gas is bubbled through the reaction mixture.

7. A process according to claim 5 and in which at least some of the said alcohol is introduced to the reaction mixture at a higher level than that at which the alkylphosphonous dichloride is admitted.

References Cited in the file of this patent

UNITED STATES PATENTS

| | | |
|---|---|---|
| 2,248,109 | Morrison et al. | July 8, 1941 |
| 2,377,870 | Engelke | June 12, 1945 |
| 2,762,692 | Spitz et al. | Sept. 11, 1956 |
| 2,794,821 | Loughran et al. | June 4, 1957 |

OTHER REFERENCES

Hoffman et al.: "J. Am. Chem. Soc.," vol. 80, No. 15, August 5, 1958, pp. 3945–48.